(No Model.)
A. CARR.
AGRICULTURAL MACHINE.
No. 512,006. Patented Jan. 2, 1894.
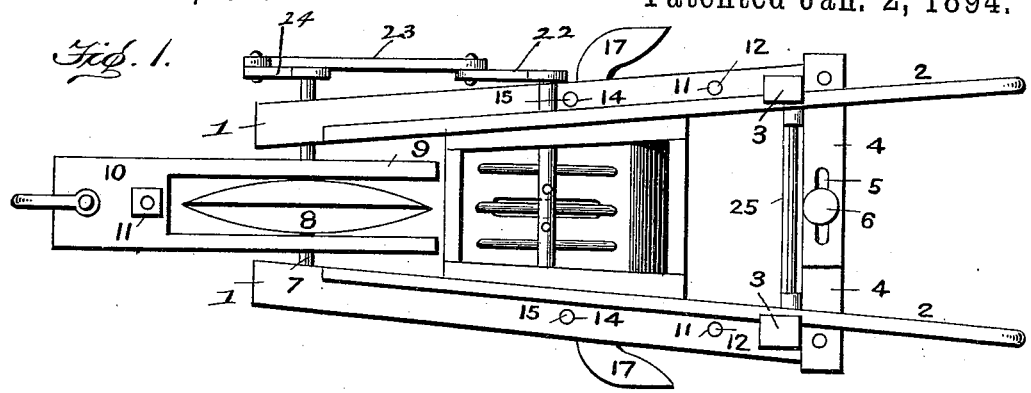
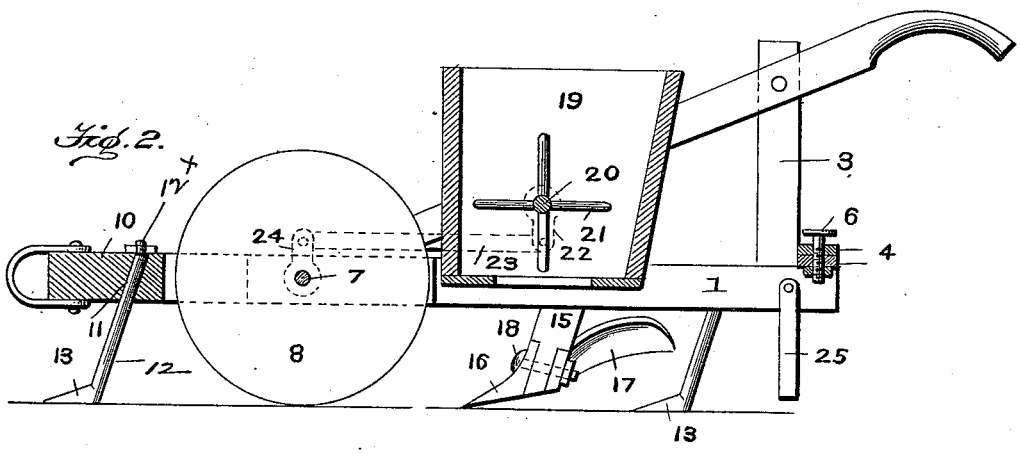
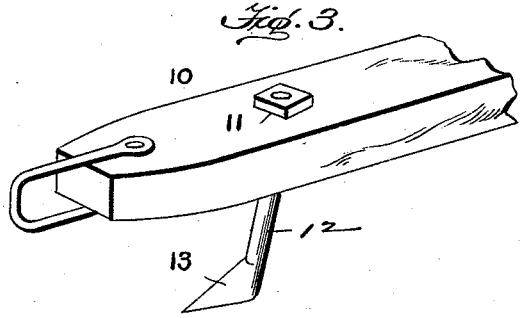
Witnesses:
Alexander Carr,
Inventor.

UNITED STATES PATENT OFFICE.

ALEXANDER CARR, OF CHAMBERSVILLE, ARKANSAS.

AGRICULTURAL MACHINE.

SPECIFICATION forming part of Letters Patent No. 512,006, dated January 2, 1894.

Application filed February 18, 1893. Serial No. 462,914. (No model.)

*To all whom it may concern:*

Be it known that I, ALEXANDER CARR, a citizen of the United States, residing at Chambersville, in the county of Calhoun and State of Arkansas, have invented certain new and useful Improvements in Agricultural Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in agricultural machines, and refers specially to a machine adapted to perform the functions of a planter, harrow or cultivator and cotton chopper or scraper, and the main object of the invention is the provision of a machine of the character named which will perform its functions in a thorough manner, which will be strong and durable to withstand the hard usage and which can be produced at a low price thus rendering the machine practical and economical.

To attain the desired object the invention consists of an agricultural machine embodying novel features of construction, combination and adaptation of parts for service as fully disclosed herein.

Figure 1 is a plan view of my machine. Fig. 2 is a longitudinal section, and Fig. 3 is a detail view.

The frame of my machine consists of the longitudinal beams 1, the handles 2 and the uprights or standards 3, and the bars are made laterally adjustable at the rear by means of the plates or strips 4, having slots 5, and the set or adjusting screw 6, as will be understood. In the forward ends of the beams is journaled the axle 7, carrying the colter wheel 8, and said wheel is arranged in the bifurcated end 9 of the draft bar 10. In the draft bar and in the beams are openings 11, in which are placed the shanks 12 carrying the feet 13 which are arranged at substantially a right angle to the shanks and they serve as harrow teeth. These shanks are provided at their upper ends with screw threaded portions or stems $12^x$, bent at an angle to the body portion thereof and adapted to receive nuts $12^a$ whereby when the shank has been placed in position it may be set fast by simply applying the nut as will be perceived. It will be seen from this construction that a harrow is provided by means of which three rows or furrows may be made and the beams being adjustable laterally permit the teeth to be adjusted so that the rows may be made of diffetent widths as desired. The beams are also provided with openings 14 in which are placed the shanks 15 having at their lower ends the notches in front in which are placed the teeth 16, and in rear the notches in which are placed the cotton scrapers 17, and single bolts 18 are employed to secure the cultivator teeth and scrapers in the proper position, and it will be seen that the cultivator teeth may be used or the scrapers be used as found desirable, that is to say that the teeth may be thrown out of use or the scrapers put in use when necessary, by simply turning shanks 15 so as to bring either of said parts into operative position.

Mounted between the standards and handles is the hopper 19, in which is a shaft 20, carrying the agitators 21, and having the crank 22, with which is connected the pitman 23, having its forward end connected to the crank 24 on the axle 7, and it will be seen that when the machine is moved along the surface or ground the shaft is rotated and the agitators cause the seed or grain to drop regularly into the furrow, and at the rear of the frame is placed the coverer 25 which throws the ground into the furrow and covers the same as is evident.

It will thus be seen that I provide a machine which can be used as a harrow and adjusted to make furrows or rows of different widths; which can be used as a cotton chopper or scraper; and which can be used as a planter and which performs all of its intended functions in a perfect manner.

If desired I may dispense with the colter wheel and use the draft bar shown without the wheel as this change comes within the scope of my invention.

I claim as my invention—

In an agricultural machine, the frame having the slotted plates at the rear end, the adjusting devices carried thereby, the hopper, the agitator in the hopper, the wheel, in combination with the scrapers, furrow-openers and coverer, the opener having an angular threaded stem passed through the beam and the nut engaging said stem, substantially as shown and described.

In testimony whereof I affix my signature in presence of two witnesses.

ALEXANDER $\overset{\text{his}}{\times}$ CARR.
mark

Witnesses:
P. W. DEDMAN,
R. H. DEDMAN.